US010442498B2

(12) United States Patent
Pasqua (10) Patent No.: US 10,442,498 B2
(45) Date of Patent: Oct. 15, 2019

(54) ACTUATOR DEVICE FOR A BICYCLE GEARSHIFT AND RESPECTIVE BICYCLE GEARSHIFT

(71) Applicant: CAMPAGNOLO S.r.l., Vicenza (IT)

(72) Inventor: Paolo Pasqua, Camisano Vicentino (IT)

(73) Assignee: CAMPAGNOLO S.r.l., Vicenza (IT)

( * ) Notice: Subject to any disclaimer, the term of this patent is extended or adjusted under 35 U.S.C. 154(b) by 232 days.

(21) Appl. No.: 15/586,546

(22) Filed: May 4, 2017

(65) Prior Publication Data
US 2017/0320541 A1    Nov. 9, 2017

(30) Foreign Application Priority Data

May 4, 2016    (IT) .................. 202016000045906

(51) Int. Cl.
| | |
|---|---|
| *B62M 9/122* | (2010.01) |
| *B62M 9/1242* | (2010.01) |
| *B62M 9/132* | (2010.01) |
| *B62M 9/1342* | (2010.01) |

(52) U.S. Cl.
CPC .......... *B62M 9/122* (2013.01); *B62M 9/1242* (2013.01); *B62M 9/132* (2013.01); *B62M 9/1342* (2013.01)

(58) Field of Classification Search
CPC .... B62M 9/122; B62M 25/08; B62M 9/1242; B62M 9/1244; B62M 9/1248
USPC ...................................................... 474/80, 82
See application file for complete search history.

(56) References Cited

U.S. PATENT DOCUMENTS

| | | | | |
|---|---|---|---|---|
| RE30,524 | E * | 2/1981 | Nagano ............... | B62M 9/1244 474/82 |
| 4,507,101 | A * | 3/1985 | Nagano ............... | B62M 9/1244 474/128 |
| 4,701,152 | A * | 10/1987 | Dutil .................... | B62M 9/123 280/236 |
| 4,861,320 | A * | 8/1989 | Nagano ................ | B62M 9/127 474/80 |
| 5,358,451 | A * | 10/1994 | Lacombe .............. | B62M 9/122 474/78 |
| 6,997,835 | B2 * | 2/2006 | Fukuda ................. | B62M 9/122 474/80 |
| 7,086,974 | B2 * | 8/2006 | Dal Pra ................ | B62M 9/122 474/78 |
| 7,527,571 | B2 * | 5/2009 | Shahana ............... | B62M 9/1248 474/80 |
| 7,942,768 | B2 * | 5/2011 | Takamoto ............. | B62M 25/08 474/82 |
| 8,066,597 | B2 * | 11/2011 | Sakaue ................. | B62M 9/122 474/82 |
| 8,109,848 | B2 * | 2/2012 | Bohm .................. | B62M 9/1242 403/119 |

(Continued)

FOREIGN PATENT DOCUMENTS

EP    1970299 A2    10/2007

OTHER PUBLICATIONS

European Search Report for Application No. 17169239.5 dated Oct. 23, 2017.

*Primary Examiner* — Henry Y Liu
(74) *Attorney, Agent, or Firm* — Volpe and Koenig, P.C.

(57) ABSTRACT

A motorized bicycle gearshift that is movable between first and second operative configurations and includes a preloaded elastic element that is responsive to gearshift changes between the first and second operative conditions.

13 Claims, 10 Drawing Sheets

(56) References Cited

U.S. PATENT DOCUMENTS

| | | | | |
|---|---|---|---|---|
| 8,137,223 B2* | 3/2012 | Watarai | .................. | B62K 23/06 |
| | | | | 280/260 |
| 8,852,041 B2* | 10/2014 | Yamaguchi | ............ | B62M 9/126 |
| | | | | 474/80 |
| 8,882,618 B2* | 11/2014 | Yamaguchi | ............ | B62M 9/122 |
| | | | | 474/80 |
| 8,974,331 B2* | 3/2015 | Yamaguchi | ............ | B62M 9/122 |
| | | | | 474/80 |
| 9,221,519 B2* | 12/2015 | Pasqua | .................. | B62M 9/132 |
| 9,303,763 B2* | 4/2016 | Yamaguchi | ............. | F16H 61/68 |
| 9,580,145 B2* | 2/2017 | Capogna | ................ | B62M 9/122 |
| 9,676,444 B2* | 6/2017 | Shipman | ................ | B62M 9/122 |
| 2004/0014541 A1* | 1/2004 | Dal Pra | ................. | B62M 9/122 |
| | | | | 474/70 |
| 2008/0227572 A1* | 9/2008 | Sakaue | ................. | B62M 9/122 |
| | | | | 474/82 |
| 2009/0191994 A1* | 7/2009 | Takamoto | ............. | B62M 9/122 |
| | | | | 474/70 |
| 2014/0087901 A1* | 3/2014 | Shipman | ................ | B62M 9/132 |
| | | | | 474/82 |
| 2014/0243127 A1* | 8/2014 | Pasqua | .................. | B62M 9/132 |
| | | | | 474/80 |
| 2015/0274255 A1* | 10/2015 | Capogna | ................ | B62M 9/122 |
| | | | | 474/80 |

* cited by examiner

ACTUATOR DEVICE FOR A BICYCLE GEARSHIFT AND RESPECTIVE BICYCLE GEARSHIFT

CROSS REFERENCE TO RELATED APPLICATION

This application claims the benefit of Italian Application No. 202016000045906, filed on May 4, 2016, which is incorporated herein by reference as if fully set forth.

FIELD OF INVENTION

The present invention relates to an actuator device for a bicycle gearshift, as well as to a bicycle gearshift comprising such an actuator device.

Preferably, the bicycle is a racing bicycle.

BACKGROUND

Throughout this description and in the following claims, the gearshift referred to can be the rear gearshift (which is the one shown as a non-limiting example in the attached figures), which moves the chain among the different sprockets of the sprocket assembly associated with the rear wheel of the bicycle, or the front gearshift, which moves the chain among the different crowns of the crankset associated with the crank arms. The movement of the chain is typically actuated through the movement of a derailleur associated with an actuation kinematic mechanism.

For some time, bicycle gearshifts with motorized actuation have been commercialized, wherein the movement of the derailleur takes place by means of a drive member that is properly controlled, typically electrically.

In the development of gearshifts, a great deal of attention has been paid to the quality of the actuation operation, that is, the capability of the gearshift to carry out the gearshifting quickly and precisely.

However, in normal use, the performance of a gearshift can be compromised by knocks undergone by the gearshift itself, for example due to the bicycle falling down or even just to loading, unloading and transportation maneuvers on a vehicle. A particularly hard knock can in the most serious cases cause some members of the gearshift to break; less severe knocks, on the other hand, can cause small deformations or even only small movements of the members of the gearshift, often not even able to be detected immediately by the eye, but nevertheless such as to compromise the precision and therefore the correct operation of the gearshift. The same deformations or mutual movements can in other cases be caused during gearshifting by temporary blocking of the kinematic mechanism with respect to the drive member, as sometimes happens because of the mechanical interference between the chain and the sprockets (particularly when passing from one sprocket to another sprocket having a greater diameter).

Therefore, actuator devices have been developed which are provided with protection systems of the gearshift against knocks or undesired temporary deformations/displacements. Such knocks or undesired temporary deformations/displacements are indicated hereinafter, in brief, with the expression "excess forces".

Prior art document EP 1970299 describes an actuator device for a motorized gearshift wherein, in order to provide protection against possible excess forces, a clutch device is provided between the actuation kinematic mechanism and the motor, a clutch device consisting of a driving member, a driven member and a torsion spring that pushes the driven member against the driving member. The driving member is fixedly connected to the motor, whereas the driven member is fixedly connected to the actuation kinematic mechanism and is defined substantially by a first-class lever pivoted at a pivot pin arranged parallel to the rotation axis of the motor. The torsion spring acts on an end portion of the lever, whereas an opposite end portion of the lever comprises a tooth that, in normal operating conditions, is housed in a seat formed in the driving member. In the presence of an excess force, a rotation force is generated on the driven member that, when such a force exceeds a predetermined threshold, causes a rotation of the driving member about the pivot pin, a relative rotation between driven member and driving member and the consequent exiting of the tooth from the seat. The excess force is thus absorbed by the system thus preventing it to be transferred to the members of the actuation kinematic mechanism.

The Applicant observed that the actuator device described in the aforementioned prior art document has a significant bulk, mainly due to the shape and arrangement of the lever that defines the driven member and to the arrangement of the driven member and of the torsion spring. Furthermore, the couplings between driving member and driven member and between torsion spring and driven member, being exposed to the external environment, can be a source of critical situations in the presence of dirt or water.

The present invention provides for an actuator device for a bicycle gearshift that is more compact and reliable than the one described above with reference to the prior art.

SUMMARY

The present invention, in a first aspect thereof, relates to an actuator device for a bicycle gearshift, comprising:

an actuation kinematic mechanism configured to deform to move a derailleur of the gearshift, the actuation kinematic mechanism comprising a first body configured to be fixed to a bicycle frame, a second body configured to support the derailleur of the gearshift and a pair of articulating connecting rods that connect the first body and the second body;

a drive member configured to control the deformation of the actuation kinematic mechanism, the drive member comprising a motor fixedly connected to one of the first body and the second body, and a motion transmission element having a predetermined rotation axis and set in rotation by the motor;

a snap mechanism arranged between said motion transmission element and a connecting rod of said pair of connecting rods and comprising a first member rotating integrally with said motion transmission element and provided with a coupling seat and a second member fixedly connected to said connecting rod and comprising a coupling element that, when the actuator device is in a first operative engagement configuration, is housed at least partially in said coupling seat and allows the transfer of the rotation from said first member to said second member and that, when the actuator device is in a second operative release configuration, is not housed in said coupling seat and allows the free rotation of said first member with respect to said second member, said first operative configuration being defined when the actuator device is subjected to a force lower than a predetermined threshold force and said second operative configuration being defined when the actuator device is subjected to a force greater than said predetermined threshold force;

wherein said second member comprises:

a first cavity extending along a first direction coinciding with said predetermined rotation axis of the motion transmission element and a second cavity extending along a second direction substantially perpendicular to the first direction;

wherein said first cavity houses at least partially said first member and said second cavity houses a pre-loaded elastic element pushing against said coupling element along said second direction towards said first member so that, when the actuator device is in said first operative configuration, said coupling element is pushed into said coupling seat.

If it is wished to widen the field of operation in which the system responds quickly, the threshold force is advantageously selected to be high. If, on the other hand, it is wished to allow the device to also absorb small knocks, the threshold force is selected at a lower value. The amount of the threshold force can easily be set by suitably sizing the elastic element and/or the second cavity and/or by using spacer rings.

Advantageously, the snap mechanism described above makes it possible to pass from an operative engagement configuration in which the connecting rod rotates integrally with the motion transmission element and transfers the motion to the derailleur of the gearshift to an operative release configuration in which the connecting rod does not rotate integrally with the motion transmission element and allows free movement of the derailleur of the gearshift with respect to the other components of the actuation kinematic mechanism.

The operative release configuration can be activated automatically following a knock or undesired displacement/deformation and be kept up to the moment at which it is wished to restore the operative engagement configuration. Knocks or undesired temporary deformations/displacements of a certain size are thus totally absorbed by the snap mechanism, thus preventing them to be transmitted to the actuation kinematic mechanism.

The operative release configuration can also be activated manually before carrying out loading, unloading and transportation maneuvers of the bicycle on a vehicle, or before and after the bicycle is used. The possibility of carrying out a manual movement of the actuation kinematic mechanism also makes it possible to set the desired gear ratio in the case of failure or blocking of the gearshift. It is also possible to achieve an easier mounting and dismounting of the wheel, in the case of the rear gearshift. Indeed, the release can be exploited by the operator to facilitate the engagement or the disengagement of the chain from the sprockets.

The snap mechanism described above is therefore of the reversible type, i.e. it allows the original operative configuration to be restored (i.e. going back to the condition prior to release) without leaving residual deformations that could easily disturb the operation of the gearshift and without needing to replace any pieces. Indeed, there is no yielding or breaking of mechanical pieces and there are also no mechanical pieces that, being free to move without any constraint (since broken or no longer held in position), can accidentally strike the members of the gearshift and/or of the bicycle, damaging them.

In the second operative release configuration, the actuator device maintains its structural integrity, which allows the first operative engagement configuration to be restored without any need to replace pieces.

Advantageously, the housing inside the second member both of the pre-loaded elastic element and of the coupling between pre-loaded elastic element and first member makes the actuator device of the present invention less bulky with respect to the actuator device disclosed in EP 1970299. The second member further isolates the pre-loaded elastic element and the coupling between pre-loaded elastic element and first member from the external environment, avoiding the deposit of dirt and/or the penetration of water.

Preferably, the coupling element is a cylindrical roller or a ball.

The radius and length of the cylindrical roller and the radius of the ball can be suitably sized to set the value of the threshold force beyond which the passage from the first operative engagement configuration to the second operative release configuration occurs. The use of a cylindrical roller can be advantageous with respect to the use of a ball in cases in which there are high threshold forces, since such forces are distributed along the length of the cylindrical roller, reducing the risk of deformation of the coupling seat due to high load concentrations.

Preferably, said first cavity and said second cavity have an at least partially cylindrical transversal profile.

In this way, the first member can rotate in the first cavity about the predetermined rotation axis.

Preferably, said first member comprises an at least partially cylindrical wall and said coupling seat is formed in said wall.

In this way, when passing to the second operative release configuration the coupling element can slide on said wall.

In particular, in the case in which the coupling element is a cylindrical roller or a ball, when passing to the second operative release configuration the at least partially cylindrical wall allows the roller or ball to rotate freely on it about the predetermined rotation axis.

Preferably, the second member comprises:

a piston slidable in the second cavity and provided with a housing seat configured to house said coupling element;

a closing cover configured to close the second cavity;

wherein the pre-loaded elastic element is arranged between said piston and said cover.

Advantageously, the closing cover has the dual function of preventing dirt or water from entering into the second member and creating an abutment to keep the elastic element in the pre-loaded condition. The piston, on the other hand, has the function of pushing the coupling element and creating an abutment to keep the elastic element in the aforementioned pre-loaded condition.

Preferably, the cover is screwed into the second cavity of the second member.

In particular, the cover is associated with the second cavity of the second member through respective threadings and the position of the cover with respect to the second cavity of the second member is advantageously adjustable through screwing. In this way it is possible to adjust the pre-load of the elastic element, thus changing the predetermined threshold value.

In another preferred embodiment of the actuator device of the present invention, said embodiment being alternative to the one described previously, the cover is associated with the second cavity of the second member through hammering. In this case, the position of the cover with respect to the second cavity of the second member is unique and predetermined and the pre-load of the elastic element is equal to a unique value which is predetermined at the design stage.

Preferably, said pre-loaded elastic element comprises at least one coil spring or at least one cup spring.

In a first preferred embodiment of the actuator device of the present invention, the motion transmission element is defined by a motion transmission shaft of the motor, the first member being coaxially fixed to a free end portion of said motion transmission shaft.

In this case, preferably, the actuator device of the present invention comprises a pair of centering pins screwed into corresponding threaded holes formed, coaxially to said predetermined rotation axis, on the body which the motor is fixedly connected to, on opposite sides with respect to the motion transmission shaft, wherein a first pin of said pair of centering pins has a free end portion housed in a first calibrated hole formed in said motion transmission shaft and coaxial to said predetermined rotation axis, and a second pin of said pair of centering pins has a free end portion housed in a second calibrated hole formed in said second member and coaxial to said predetermined rotation axis.

Advantageously, the pair of centering pins ensures a correct centering of the motion transmission shaft and of the second member, i.e. it ensures that the motion transmission shaft and the first cavity of the second member are coaxial to each other and to the predetermined rotation axis.

In a second preferred embodiment of the actuator device of the present invention, said embodiment being alternative to the one described previously, the motion transmission element comprises a grooved pin housed in a grooved seat defined in said motor coaxially to said predetermined rotation axis, the first member being coaxially fixed to a free end portion of said grooved pin.

Preferably, said free end portion of said motion transmission shaft or of said grooved pin is knurled, so as to ensure a practical and reliable fixing of the first member.

In a second aspect thereof, the present invention relates to a bicycle gearshift comprising an actuator device according to the first aspect of the present invention discussed above.

Preferably, the aforementioned bicycle gearshift has, alone or in combination, all of the structural and functional features discussed above with reference to the actuator device of the present invention and therefore it allows all of the aforementioned advantages and technical effects to be obtained.

BRIEF DESCRIPTION OF THE DRAWINGS

Further features and advantages of the present invention will become clearer from the following detailed description of preferred embodiments thereof, made with reference to the attached drawings and given for indicating and not limiting purposes. In such drawings.

DETAILED DESCRIPTION OF THE PREFERRED EMBODIMENT(S)

In FIGS. 1-7 and 7a, reference numeral 100 indicates an actuator device for a bicycle gearshift, particularly a rear gearshift, according to a first preferred embodiment of the present invention.

Figure 1:
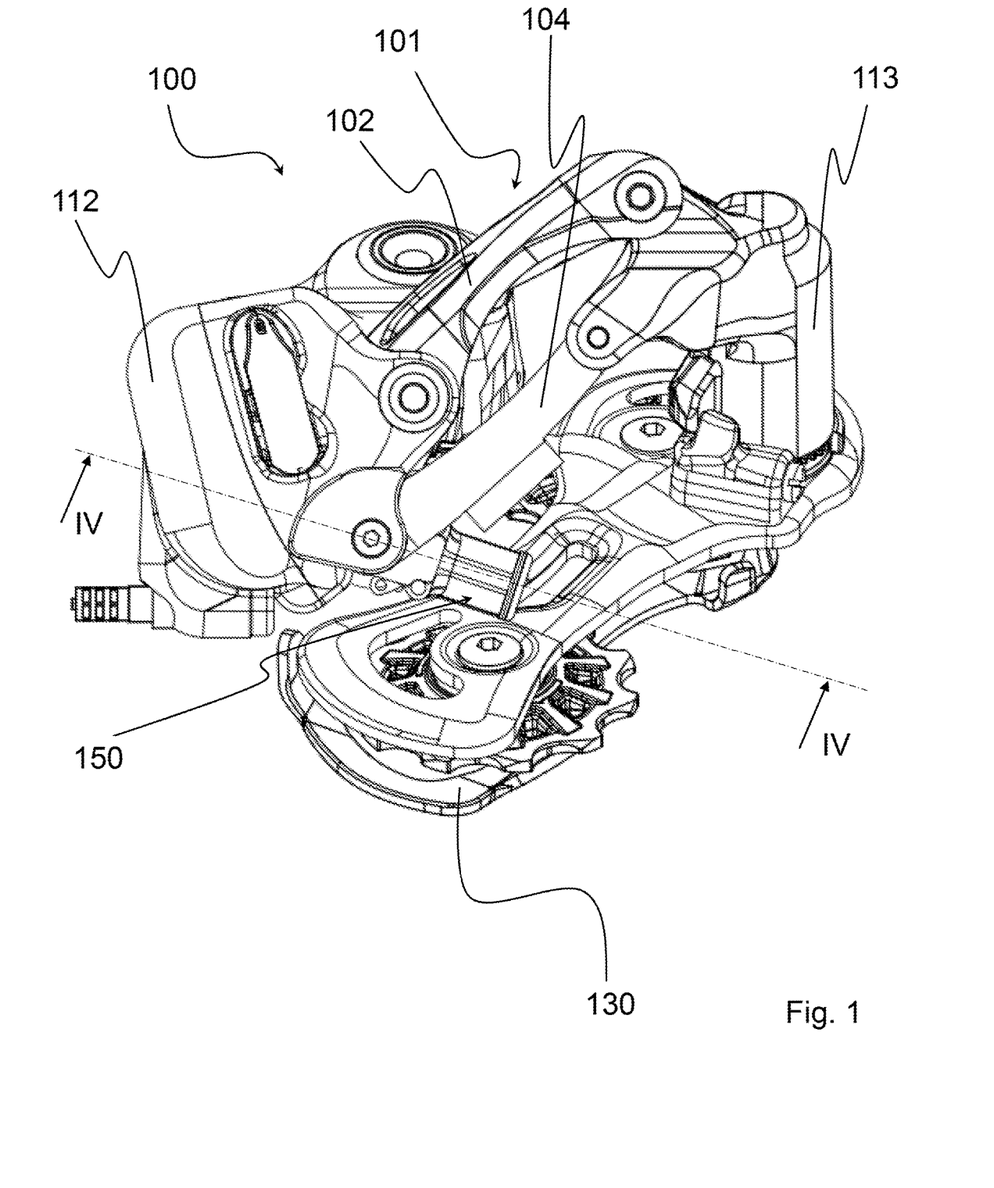
FIG. 1 is a perspective view of an actuator device in accordance with a first preferred embodiment of the present invention.
Figure 2:
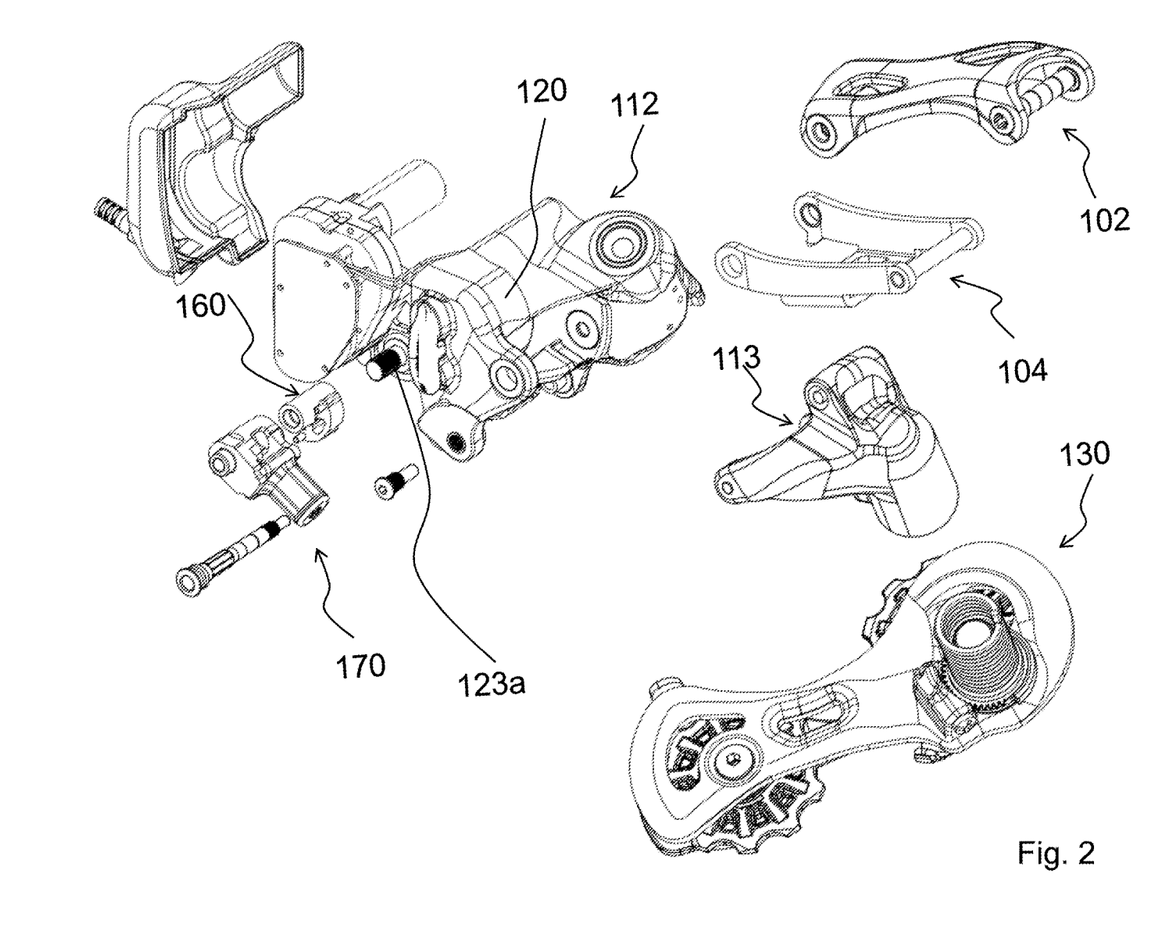
FIG. 2 is an exploded perspective view of the device of FIG. 1.

The device 100 comprises an articulated quadrilateral actuation kinematic mechanism 101, preferably shaped like an articulated parallelogram, configured to be moved by a drive member 120 and in turn to move a derailleur 130.

The actuation kinematic mechanism 101 comprises a first body 112 configured to be fixed to a bicycle frame (not shown) and wherein the drive member 120 is housed, a second body 113 that supports the derailleur 130 and a pair of articulating connecting rods 102, 104 that connect the first body 112 and the second body 113. The connecting rods 102, 104 are also respectively called "inner connecting rod" and "outer connecting rod", with reference to their relative position with respect to the middle plane of the bicycle.

The drive member 120 controls the deformation of the actuation kinematic mechanism 101, lengthening or shortening a diagonal of the articulated quadrilateral. In particular, given that the device 100 is used in a rear gearshift of a bicycle, a lengthening of such a diagonal will be used to carry out an upward gearshifting (towards a more inner toothed wheel of the sprocket, having a greater diameter), whereas vice-versa a shortening of the diagonal will be used to carry out a downward gearshifting (towards a more outer toothed wheel of the sprocket, having a smaller diameter).

Figure 4:
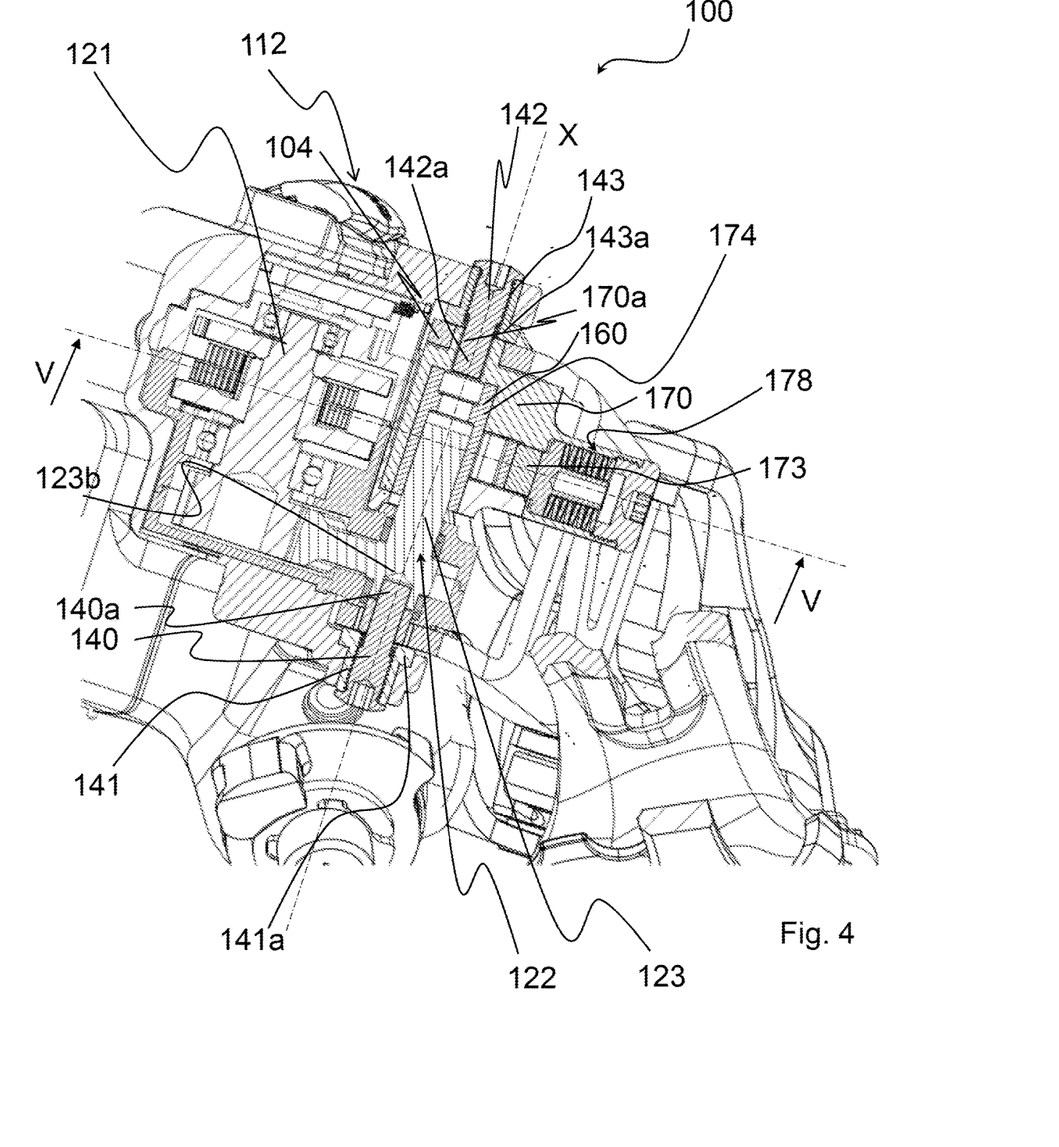
FIG. 4 is a section view of an enlarged portion of the device of FIG. 1, taken according to the plane line IV-IV of FIG. 1.

With reference to FIG. 4, the drive member 120 comprises an electric motor 121 (powered and controlled by means of cables and control members not shown in the Figures), fixedly connected to the first body 112, and a motion transmission element 122, having a predetermined rotation axis X and set in rotation by the motor 121.

In this first embodiment, the motion transmission element 122 is defined by a motion transmission shaft 123 of the motor 121.

A snap mechanism 150 is arranged between the motion transmission element 122 and the inner connecting rod 104.

The snap mechanism 150 defines in the actuator device 100 a first operative engagement configuration wherein the connecting rod 104 rotates integrally with the motion transmission element 122 and a second operative release configuration wherein the connecting rod 104 does not rotate integrally with the motion transmission element 122.

The first operative configuration is defined when the actuator device 100 is subjected to a force lower than a predetermined threshold force and the second operative configuration is defined when the actuator device 100 is subjected to a force greater than the predetermined threshold force.

The snap mechanism 150 comprises a first member 160 rotating integrally with the motion transmission element 122 and a second member 170 fixedly connected to the connecting rod 104.

Figure 3:
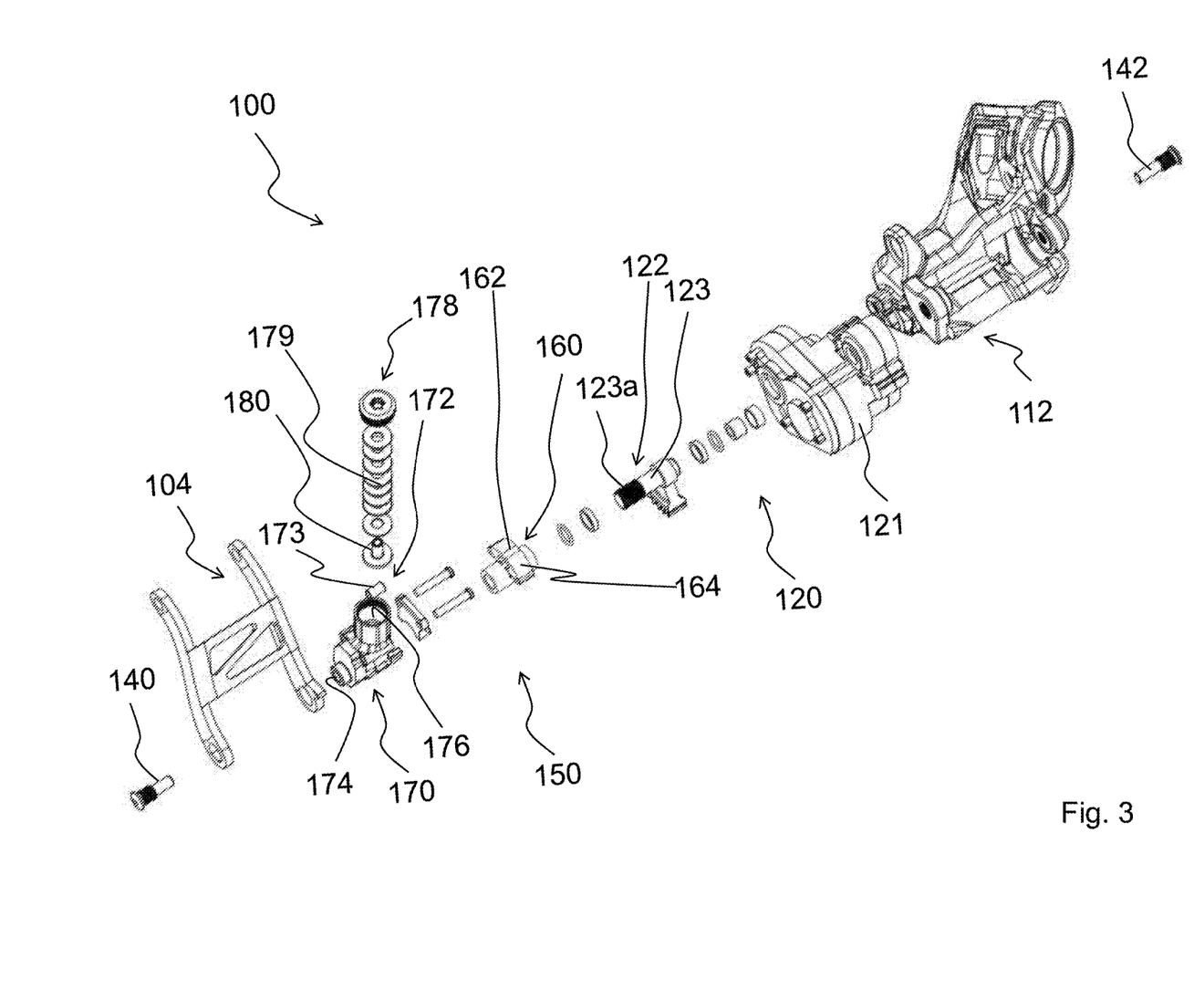
FIG. 3 is an exploded perspective view of a part of the device of FIG. 1.

The first member 160 is coaxially fixed to a free end portion 123*a* of the motion transmission shaft 123 (FIG. 3). The free end portion 123*a* of the motion transmission shaft 123 is knurled.

The first member 160 comprises an at least partially cylindrical wall 164 in which a coupling seat 162 is formed for housing a coupling element 172 associated with the second member 170.

In this first embodiment of the actuator device of the present invention, the coupling element 172 is a cylindrical roller 173. However, the present description also applies to the case in which instead of the cylindrical roller 173 a ball is used.

Figure 5:
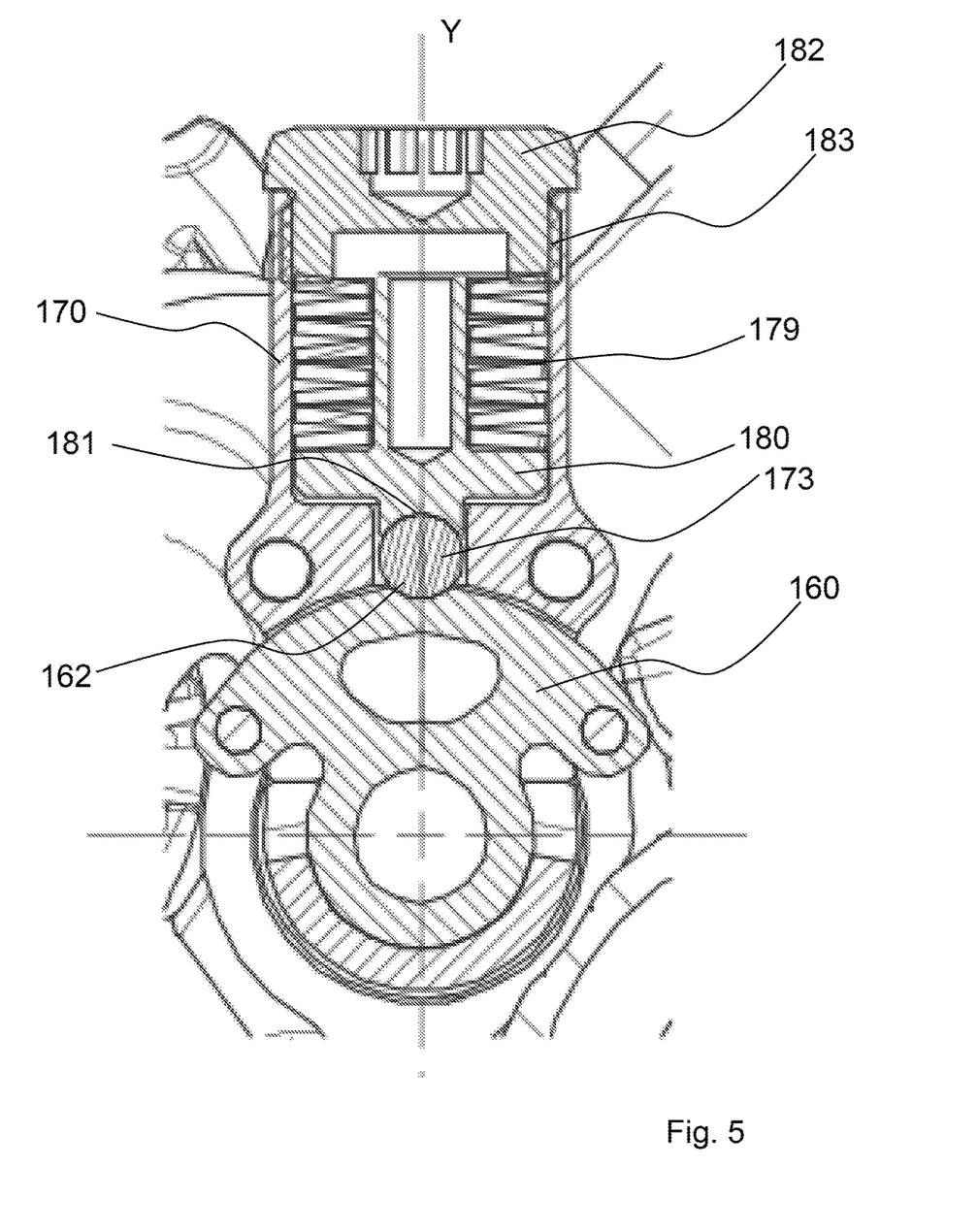
FIG. 5 is a section view of an enlarged portion of the device of FIG. 4, taken according to the plane line V-V of FIG. 4, wherein the actuator device is in a first operative engagement configuration.

When the actuator device 100 is in the first operative configuration, shown for example in FIG. 5, the coupling element 172 is housed at least partially in the coupling seat 162 and allows the transfer of the rotation from the first member 160 to the second member 170. On the other hand, when the actuator device 100 is in the second operative configuration, shown for example in FIGS. 6 and 7, the coupling element 172 is not housed in the coupling seat 162 and allows the free rotation of the first member 160 with respect to the second member 170.

Figure 6:
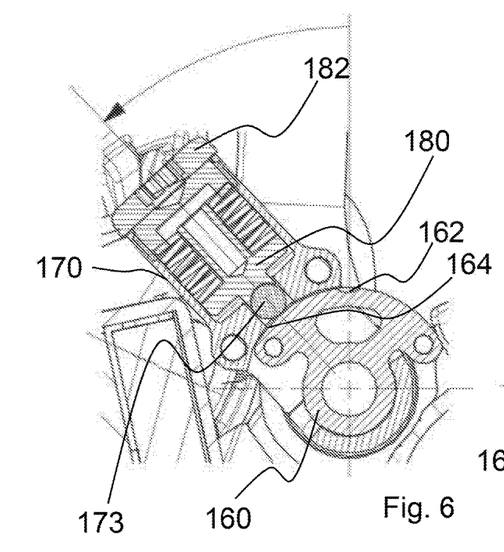
FIGS. 6 and 7 are two section views analogous to that of FIG. 5, wherein the actuator device is in two different positions of a second operative release configuration.
Figure 7:
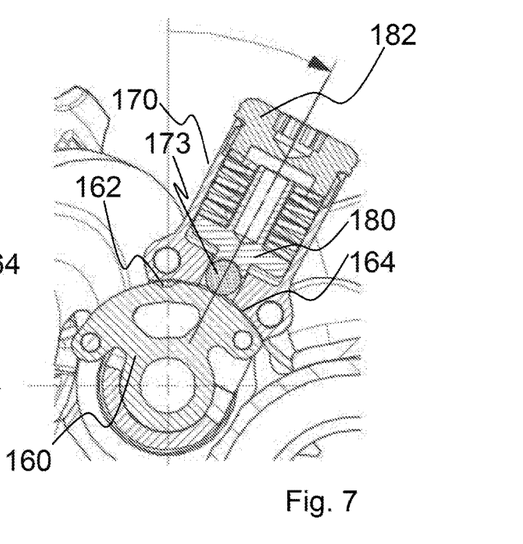

In particular, in FIG. 6 the actuator device 100 is in a first so-called "closed" condition of the bicycle gearshift, which in FIG. 6 corresponds to a rotation of the second member 170 with respect to the first member 160 in the counter-clockwise direction, whereas in FIG. 7 the actuator device 100 is in a second so-called "open" condition of the bicycle gearshift, which in FIG. 7 corresponds to a rotation of the second member 170 with respect to the first member 160 in the clockwise direction.

Figure 7A:
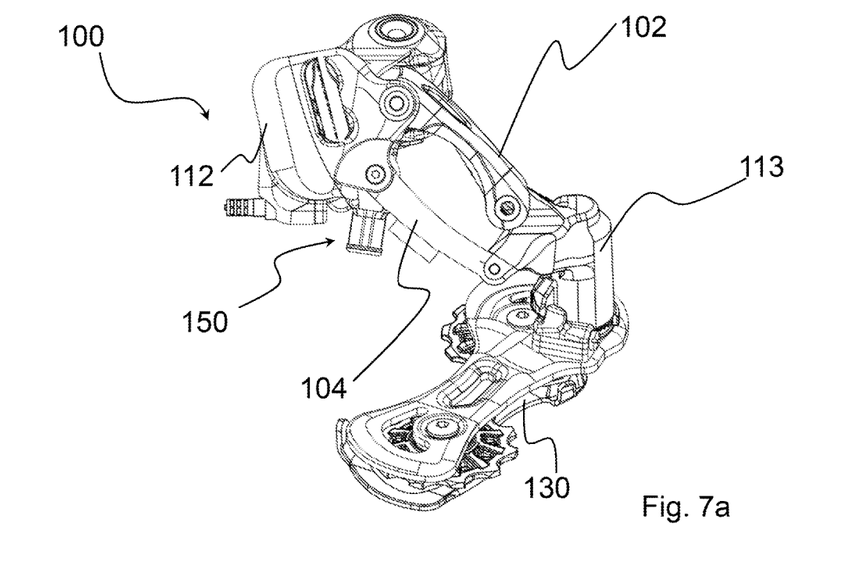
FIG. 7a is a perspective view of the actuator device of FIG. 1 when it is in the position shown in FIG. 7.

FIG. 7*a* illustrates the actuator device 100 in the aforementioned "open" condition.

Preferably, beveled joining surfaces are provided between the coupling seat 162 and the at least partially cylindrical wall 164. In this way, the passage from the first operative configuration to the second operative configuration, and vice-versa, is made easier, assigning the reaction to the collision or undesired displacement/deformation exclusively to the pre-load of a pre-loaded elastic element 178, which is described better hereinafter.

The term "elastic element" is generically used to indicate an element capable of providing an elastic reaction of any type, that is, when subjected to traction, compression, torsion, bending. The elastic element can for example be a metal coil spring, a metal torsion spring, a metal cup spring, a flexible layer, an air spring, an elastomeric spring of various configuration, and the like. The adjective "pre-loaded" is used to indicate that the elastic element is used in a pre-biased state, for example pre-compressed or pre-stretched, so that at rest it exerts a non-zero elastic force, equal to the predetermined threshold force. The elastic element is thus in a condition to elastically yield only if the force discharged thereon is greater than the predetermined threshold force value, like in the case of a collision; if, on the other hand, the force discharged thereon is lower, like in the case of normal use of the gearshift, the elastic element does not offer any yielding. In this last condition, therefore, the elastic element behaves like a substantially rigid body and its pliability does not interfere with the normal operation of the gearshift.

The second member 170 comprises a first cavity 174 extending along a first direction, coinciding with the rotation axis X of the motion transmission element 122, and a second cavity 176 extending along a second direction Y substantially perpendicular to the first direction.

The first cavity 174 and the second cavity 176 of the second member 170 have an at least partially cylindrical transversal profile.

The first cavity 174 houses at least partially the first member 160.

The second cavity 176 houses the pre-loaded elastic element 178. In this first embodiment of the actuator device of the present invention, the pre-loaded elastic element 178 comprises a plurality of cup springs 179 arranged juxtaposed (in particular, see FIGS. 3 and 5).

The pre-loaded elastic element 178 pushes against the coupling element 172 along the second direction towards the first member 160 so that, when the actuator device 100 is in the first operative configuration, the coupling element 172 is pushed into the coupling seat 162.

In particular, the second member 170 comprises a piston 180 slidable in the second cavity 176 and a closing cover 182 configured to close the second cavity 176. The pre-loaded elastic element 178 is arranged between the piston 180 and the cover 182.

The piston 180 is provided with a housing seat 181 configured to house the coupling element 172.

The cover 182 is screwed into the second cavity 176 of the second member 170. In particular, the cover 182 is associated with the second cavity 176 of the second member 170 through respective threadings (wholly indicated with 183 in FIG. 5) and the position of the cover 182 with respect to the second cavity 176 of the second member 170 is adjustable through screwing.

As shown in particular in FIGS. 3 and 4, the actuator device 100 of the present invention further comprises a pair of centering pins 140, 142. They are screwed into corresponding threaded holes 141, 143 formed on the first body 112, coaxially to the rotation axis X, on opposite sides with respect to the motion transmission shaft 123. In particular, the threaded holes 141, 143 are formed in metallic inserts 141*a*, 143*a* hammered into respective through holes made on the first body 112.

The centering pin 140 has a free end portion 140*a* that is housed in a calibrated hole 123*b* formed in the motion transmission shaft 123 and coaxial to the rotation axis X. In the non-limiting example shown in FIG. 4, the calibrated hole 123*b* is a blind hole.

The centering pin 142 has a free end portion 142*a* that is housed in a calibrated hole 170*a* formed in the second member 170 and coaxial to the rotation axis X. In the non-limiting example shown in FIG. 4, the calibrated hole 170*a* is a through hole.

FIGS. 8-11 show a second preferred embodiment of an actuator device 100 for a bicycle gearshift according to the present invention.

Those components of the actuator device 100 of FIGS. 8-11 which are analogous or functionally equivalent to the components of the actuator device 100 of FIGS. 1-7 and 7*a* are indicated with the same reference numeral and as to the description thereof reference can be made to the above description.

The actuator device 100 of FIGS. 8-11 differs from the actuator device 100 of FIGS. 1-7 and 7*a* in various aspects.

Figure 8:
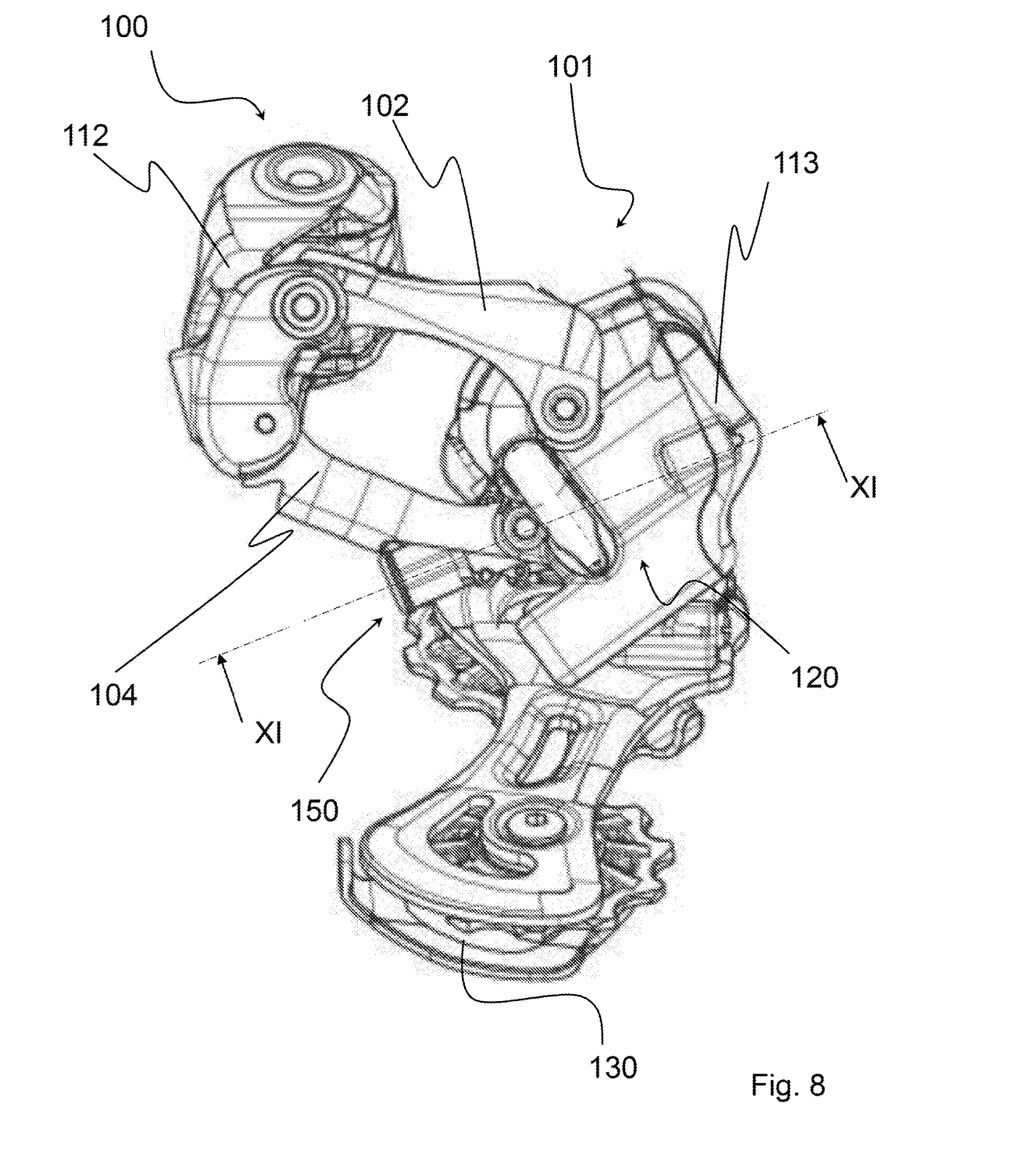
FIG. 8 is a perspective view of an actuator device in accordance with a second preferred embodiment of the present invention.
Figure 9:
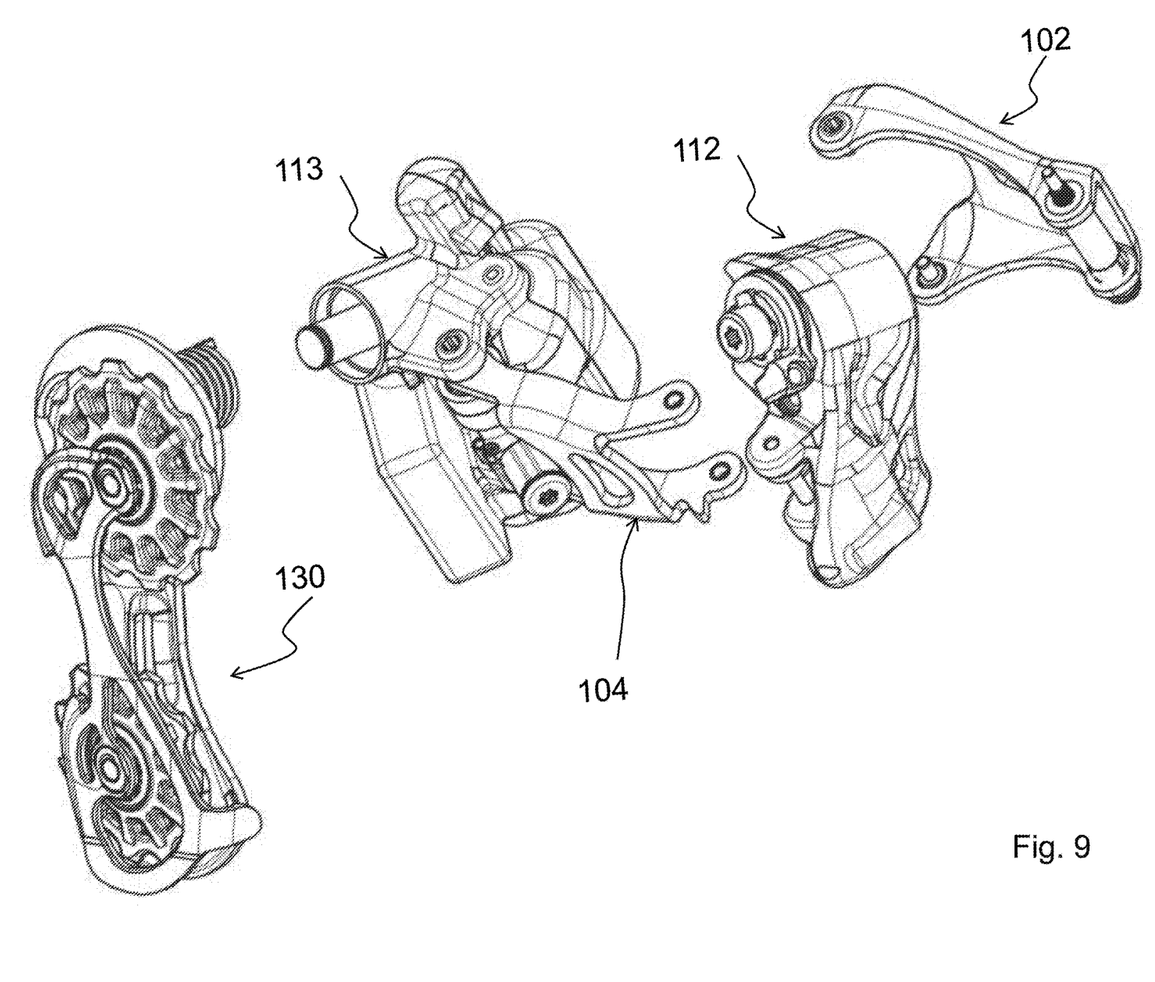
FIG. 9 is an exploded perspective view of the device of FIG. 8.

A first aspect of differentiation is that the drive member 120 is housed in the second body 113.

Figure 11:
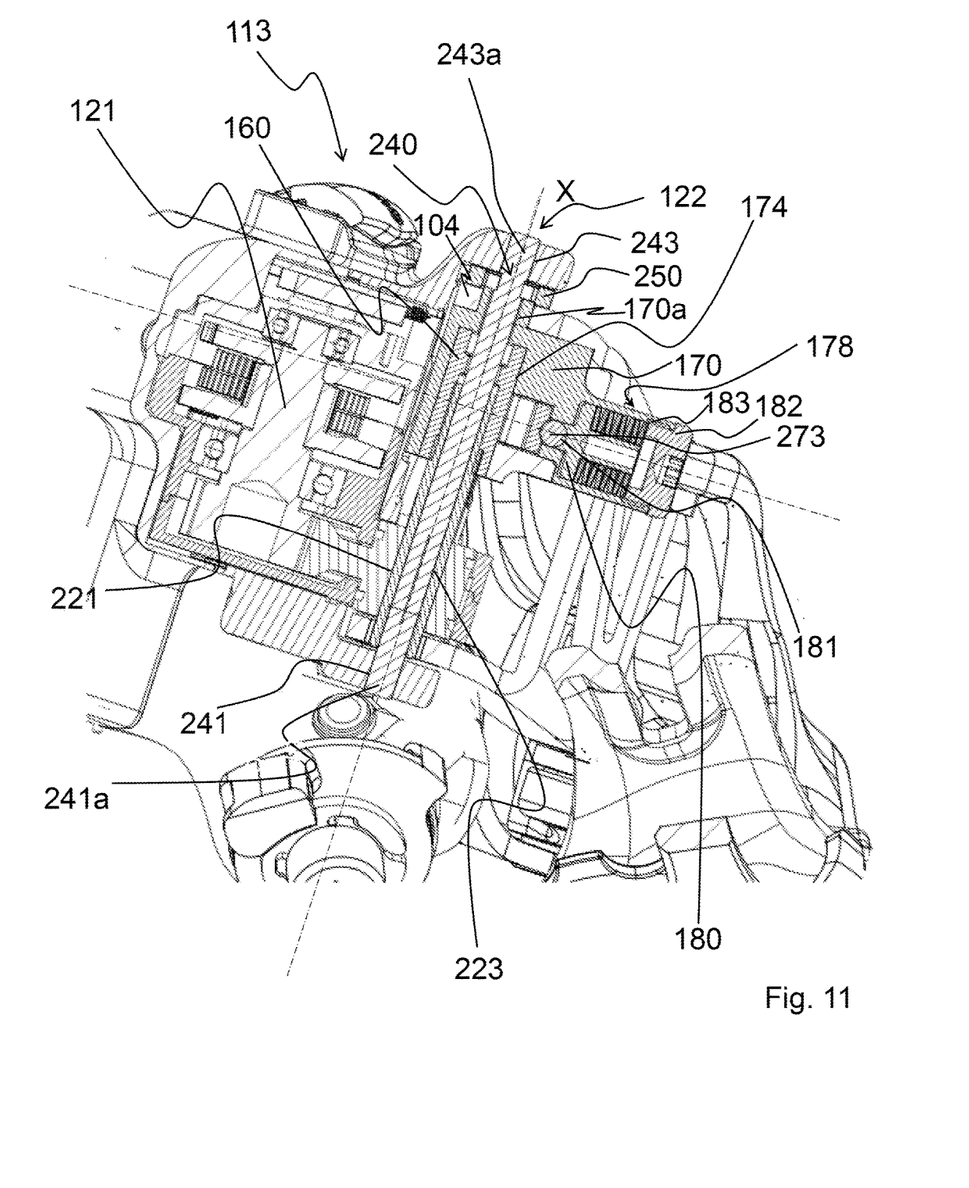
FIG. 11 is a section view of an enlarged portion of the device of FIG. 8, taken according to the plane line XI-XI of FIG. 8.

Another aspect of differentiation is that the motion transmission element 122 comprises a grooved pin 223 housed in a grooved seat 221 defined in the motor 121 coaxially to the rotation axis X.

Figure 10:
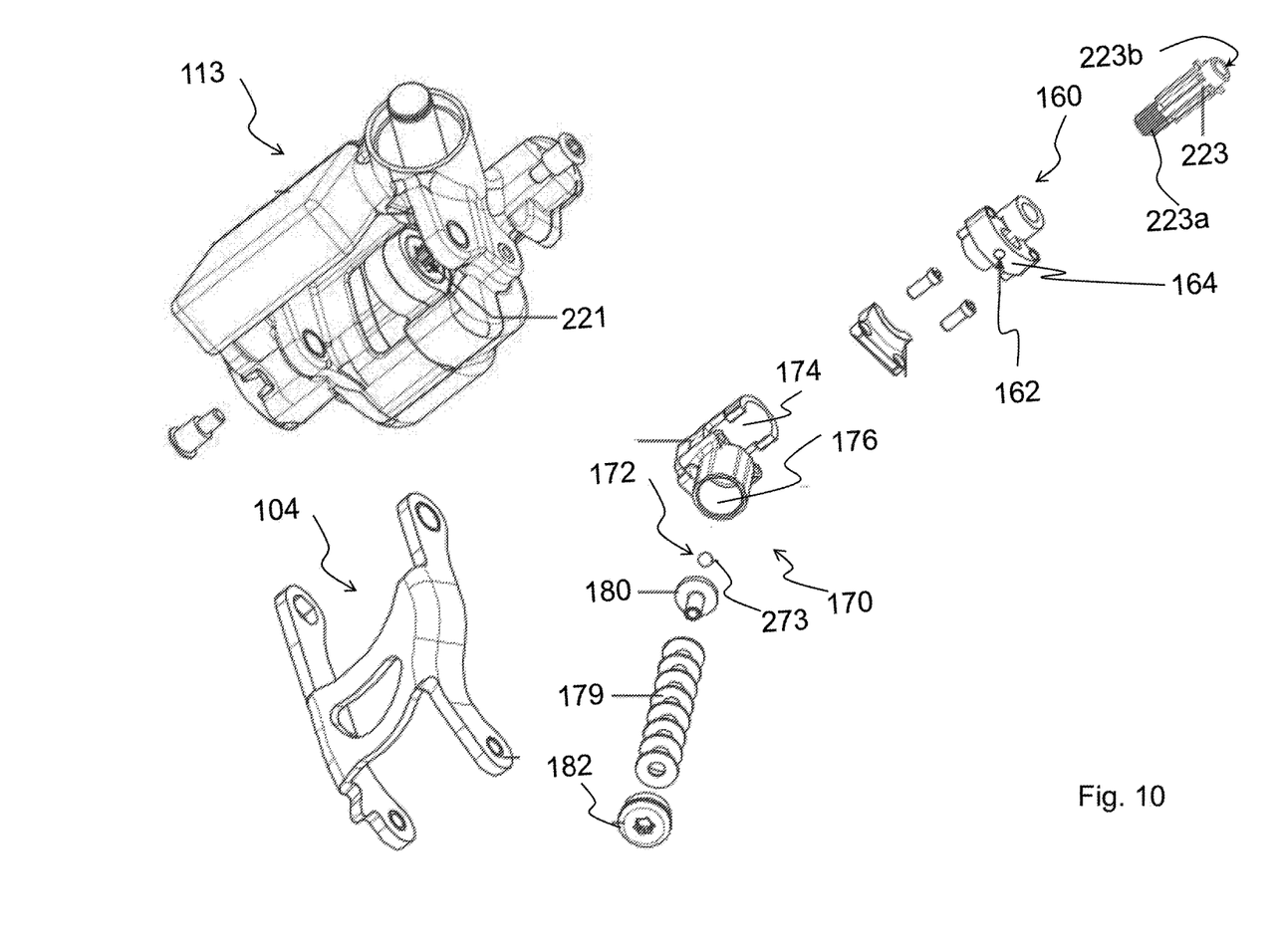
FIG. 10 is an exploded perspective view of a part of the device of FIG. 8.

In this second embodiment of the actuator device of the present invention, the first member 160 is coaxially fixed to a free end portion 223a of the grooved pin 223. The free end portion 223a of the grooved pin 223 is knurled.

In this second embodiment of the actuator device of the present invention, the coupling element 172 is a ball 273. However the present description also applies to the case in which instead of the ball 273 a cylindrical roller is used.

As shown in particular in FIGS. 10 and 11, the grooved pin 223 has a calibrated through cavity 223b which houses a centering shaft 240 that passes, at opposite free end portions thereof 241a, 243a, through a pair of calibrated holes 241, 243 formed, coaxially to the rotation axis X, on the second body 113. Moreover, the centering shaft 240 passes through a calibrated hole 170a formed in the second member 170 and coaxial to the rotation axis X.

The centering shaft 240 is fixed in an axial position through a calibrated washer 250. The washer 250 is fitted in a suitable housing seat formed on the centering shaft 240, so as to prevent it from slipping out.

In the non-limiting example shown in FIG. 11, the calibrated washer 250 is arranged, coaxially to the rotation axis X, between the calibrated hole 243 of the second body 113 and the calibrated hole 170a of the second member 170.

In an embodiment that is not illustrated, the second member 170 comprises, in addition to the second cavity 176, a further cavity extending along a direction substantially perpendicular to the rotation axis X. Such a further cavity houses a further pre-loaded elastic element pushing against a further coupling element configured to couple with the first member 160 so that, when the actuator device 100 is in the first operative configuration, the further coupling element is pushed into a respective further coupling seat formed in the first member 160. In this way, the value of the threshold force beyond which the passing from the first operative engagement configuration to the second operative release configuration occurs is increased.

During travel, the actuator device 100 is normally in the operative engagement configuration thereof, wherein the connecting rod 104 rotates integrally with the motion transmission element 122 and transfers the motion to the derailleur 130 of the gearshift. The coupling element 172 is housed in the coupling seat 162, as shown in FIG. 5.

During the various gearshifting operations, the relative position between the first member 160 and the body 112 or 113 in which it is housed (and therefore the relative position between connecting rod 104 and frame) changes. However, the relative position between first member 160 and second member 170 does not change. Indeed, the coupling element 172 always remains housed in the coupling seat 162, since load values greater than the predetermined threshold force value are not reached.

Following a knock, if such a knock is such as to generate a load that exceeds the predetermined threshold force value, or following a manual actuation, the coupling element 172 comes out from the coupling seat 162 allowing the first member 160 to rotate with respect to the second member 170 (as shown in FIG. 6 or 7). The actuator device 100 in this case is in the operative release configuration thereof.

Of course, those skilled in the art can bring many modifications and changes to the actuator device for a bicycle gearshift described above, in order to satisfy specific and contingent requirements, all of which are in any case within the scope of protection of the present invention as defined by the following claims.

What is claimed is:

1. An actuator device for a bicycle gearshift, comprising:
a deformable actuation kinematic mechanism that moves a derailleur of the gearshift, the actuation kinematic mechanism comprising a first body configured to be fixed to a bicycle frame, a second body configured to support the derailleur of the gearshift and a pair of articulating connecting rods that connect the first body and the second body;
a drive member configured to control the deformation of the actuation kinematic mechanism, the drive member comprising a motor fixedly connected to one of the first body and the second body, and a motion transmission element having a predetermined rotation axis (X) and set in rotation by the motor; and
a snap mechanism arranged between said motion transmission element and a connecting rod of said pair of connecting rods and comprising a first member rotating integrally with said motion transmission element and provided with a coupling seat, and a second member fixedly connected to said connecting rod and comprising a coupling element that, when the actuator device is in a first operative engagement configuration, is housed at least partially in said coupling seat and allows the transfer of the rotation from said first member to said second member and that, when the actuator device is in a second operative release configuration, is not housed in said coupling seat and allows the free rotation of said first member with respect to said second member, said first operative configuration being defined when the actuator device is subjected to a force lower than a predetermined threshold force and said second operative configuration being defined when the actuator device is subjected to a force greater than said predetermined threshold force,
wherein said second member comprises a first cavity extending along a first direction coinciding with said predetermined rotation axis (X) and a second cavity extending along a second direction substantially perpendicular to the first direction, wherein said first cavity houses at least partially said first member and said second cavity houses a pre-loaded elastic element pushing against said coupling element along said second direction towards said first member so that, when the actuator device is in said first operative configuration, said coupling element is pushed into said coupling seat.

2. The device according to claim 1, wherein the coupling element is a cylindrical roller or a ball.

3. The device according to claim 1, wherein said first cavity and said second cavity have an at least partially cylindrical transversal profile.

4. The device according to claim 1, wherein said first member comprises an at least partially cylindrical wall and wherein said coupling seat is formed in said wall.

5. The device according to claim 1, wherein the second member comprises:
a piston sliding in the second cavity and provided with a housing seat configured to house said coupling element; and
a cover configured to close the second cavity,
wherein the pre-loaded elastic element is arranged between said piston and said cover.

6. The device according to claim 5, wherein the cover is screwed into the second cavity of the second member.

7. The device according to claim 1, wherein said pre-loaded elastic element comprises at least one coil spring or at least one cup spring.

8. The device according to claim 1, wherein the motion transmission element is defined by a motion transmission shaft of the motor, the first member being coaxially fixed to a free end portion of said motion transmission shaft.

9. The device according to claim 8, comprising a pair of centering pins screwed into corresponding threaded holes formed, coaxially to said predetermined rotation axis (X), on the body which the motor is fixedly connected to, on opposite sides with respect to the motion transmission shaft, wherein a first pin of said pair of centering pins has a free end portion housed in a first calibrated hole formed in said motion transmission shaft and coaxial to said predetermined rotation axis (X), and a second pin of said pair of centering pins has a free end portion housed in a second calibrated hole formed in said second member and coaxial to said predetermined rotation axis (X).

10. The device according to claim 1, wherein the motion transmission element comprises a grooved pin housed in a grooved seat defined in said motor coaxially to said predetermined rotation axis (X), the first member being coaxially fixed to a free end portion of said grooved pin.

11. The device according to claim 8, wherein said free end portion of said motion transmission shaft is knurled.

12. The device according to claim 10, wherein said free end portion of said grooved pin is knurled.

13. A bicycle gearshift comprising an actuator device according to claim 1.

* * * * *